(12) United States Patent
Hohenboeken et al.

(10) Patent No.: US 9,194,279 B2
(45) Date of Patent: Nov. 24, 2015

(54) THERMOSTAT WITH LOCKING ARMS FOR COOLANT FILLING

(75) Inventors: Kay Hohenboeken, Cologne (DE); Bert Pingen, Swisttal (DE); Michael Tobergte, Cologne (DE); Stefan Quiring, Leverkusen (DE); Richard Fritsche, Wermelskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 978 days.

(21) Appl. No.: 13/114,213

(22) Filed: May 24, 2011

(65) Prior Publication Data
US 2011/0303295 A1 Dec. 15, 2011

(30) Foreign Application Priority Data

Jun. 10, 2010 (DE) .......................... 10 2010 029 940

(51) Int. Cl.
| F01P 7/16 | (2006.01) |
| F01P 11/02 | (2006.01) |
| G05D 23/13 | (2006.01) |
| F16K 17/38 | (2006.01) |
| G05D 23/02 | (2006.01) |

(52) U.S. Cl.
CPC ............... *F01P 11/0276* (2013.01); *F01P 7/16* (2013.01); *F01P 11/02* (2013.01); *F01P 11/0204* (2013.01); *F16K 17/383* (2013.01); *G05D 23/022* (2013.01); *G05D 23/1333* (2013.01); *Y10T 137/0318* (2015.04)

(58) Field of Classification Search
CPC ......... F01P 7/16; F01P 11/0204; F01P 11/02; G05D 23/022; G05D 23/1333; F16K 17/383

USPC ............ 251/89, 94; 137/316; 62/93 R, 999 J, 62/100, 101 C, 99 J

See application file for complete search history.

(56) References Cited

U.S. PATENT DOCUMENTS

| 4,456,167 A | * | 6/1984 | Buter ........................... 236/34.5 |
| 4,691,861 A | * | 9/1987 | Sliger et al. .................. 236/34.5 |
| 4,967,780 A | * | 11/1990 | Minami .......................... 137/60 |
| 4,978,060 A | * | 12/1990 | Stahly .......................... 236/34.5 |

(Continued)

FOREIGN PATENT DOCUMENTS

| DE | 3740500 C1 | 4/1989 |
| DE | 19547493 C1 | 3/1997 |

*Primary Examiner* — Marc Norman
*Assistant Examiner* — Max Snow
(74) *Attorney, Agent, or Firm* — Julia Voutyras; Alleman Hall McCoy Russell & Tuttle LLP (57) ABSTRACT

The disclosure relates to a control valve for a medium circuit of an internal combustion engine, in particular to a thermostat of a coolant circuit of the internal combustion engine. The control valve includes a valve housing, an expansible material element arranged in a valve body, an energy accumulator having an abutment element, a valve seat, and at least one locking element arranged on the abutment element, each locking element having a counter-latching face. The control valve has a first position wherein the counter-latching face of each locking element is in a non-positive connection with a corresponding latching face of the valve housing in order to force the control valve into a mechanically blocked, forced-open position, the latching face being formed by means of an opening edge in the valve housing. This position may enable a quick and reliable initial filling or refilling of the coolant circuit.

6 Claims, 7 Drawing Sheets

(56) References Cited

U.S. PATENT DOCUMENTS

| | | | |
|---|---|---|---|
| 5,294,046 A | 3/1994 | Fishman | |
| 5,452,852 A * | 9/1995 | Marckel | 236/34.5 |
| 5,690,276 A * | 11/1997 | Thiel et al. | 236/34.5 |
| 6,019,171 A * | 2/2000 | Johnson | 165/174 |
| 6,347,745 B1 * | 2/2002 | McClure | 236/34.5 |
| 2004/0238031 A1 * | 12/2004 | Lee | 137/74 |
| 2007/0290056 A1 * | 12/2007 | Fishman | 236/34.5 |
| 2011/0095091 A1 * | 4/2011 | Suda et al. | 236/34 |
| 2012/0118987 A1 * | 5/2012 | Brenner | 236/93 R |

* cited by examiner

THERMOSTAT WITH LOCKING ARMS FOR COOLANT FILLING

RELATED APPLICATIONS

This application claims priority to German Patent Application 102010029940.5 filed Jun. 10, 2010, the entire contents of which being incorporated herein by reference.

FIELD

The present disclosure relates to a control valve for a medium circuit of an internal combustion engine.

BACKGROUND AND SUMMARY

In internal combustion engines, valves may be used to control a flow of medium, in particular a thermostat of a coolant circuit of the internal combustion engine. Such control valves may comprise a valve housing in which an expansible material element is arranged in a valve body which is operatively connected to an energy accumulator which has an abutment element which may be positioned adjacent to a corresponding valve seat.

Control valves of this type are known, for example, as thermostats of coolant circuits. However, such control valves may also be used in another medium circuit of the internal combustion engine, for example in an oil circuit.

DE 195 47 493 C1 describes a method and a device for initial filling of a fluid circuit of an internal combustion engine with a fluid which is delivered by a fluid feed pump to the fluid circuit. Arranged in the fluid circuit is a spring-loaded stop valve which is moved at least temporarily to an open position for the initial filling, in particular for the initial filling of the oil circuit with lubricating oil. At the start of the initial filling, the stop valve is already set in the open position by a distance element. The distance element is arranged between the seat face of the valve body and the seat face of the valve housing and is in the form of an elastic flap. A venting gap via which the air is displaced from the oil passages by the oil feed pump is formed by the pinched flap. As a result of the flow and the pressure of the lubricating oil, the flap folds out, so that the stop valve can adopt its normal function as a nonreturn valve. After the initial filling, the flap remains in its folded-out position.

Usually, motor vehicles, or their internal combustion engines, are filled or initially filled with the required operating media at the end of the production line. For this purpose, it is attempted to carry out the initial filling in a manner as efficient and time-saving as possible, that is, quickly and reliably. For example, the cooling system is evacuated for this purpose before the coolant is introduced. Nevertheless, air bubbles can remain in the system, since the thermostat is usually closed and therefore in effect forms a blockage which prevents an unimpeded flow of coolant during filling. The initial filling process is thereby extended in time. Problems also occur during a necessary refilling or topping-up process, for example during rotating, recurrent maintenance operations in workshops or the like, since these workshops possibly have not acquired an evacuation device. In particular, refilling or topping-up for maintenance purposes can have the result that the required quantity of medium is not achieved—that is, the system is filled more or less than required. This involves uncertainty factors which under certain circumstances can lead to failure of or damage to the internal combustion engine.

The inventors have herein recognized the above issues and have devised an approach to at least partially address them.

Thus in one embodiment of the disclosure, a control valve for a medium circuit is provided. The control valve comprises a valve housing, an expansible material element arranged in a valve body, an energy accumulator having an abutment element, a valve seat, and at least one locking element arranged on the abutment element, each locking element having a counter-latching face. The control valve has a first position wherein the counter-latching face of each locking element is in a non-positive connection with a corresponding latching face of the valve housing in order to force the control valve into a mechanically blocked, forced-open position, the latching face being formed by means of an opening edge in the valve housing.

The control valve may be installed in the medium circuit, for example in the coolant circuit, in a completely open position by the manufacturer of the motor vehicle or of the internal combustion engine. To this end the counter-latching face of the abutment element may merely be brought into non-positive connection with the latching face of the valve housing. In this way the passages or conduits leading to the medium circuit which are to be controlled by the control valve are held open for an initial filling, so that a rapid and reliable initial filling can be made possible. Since the control valve therefore no longer blocks the coolant circuit, a preliminary evacuation of the system can also be dispensed with. In this manner, both initial filling by the manufacturer and also refilling and topping-up for maintenance purposes can be carried out quickly and reliably.

DETAILED DESCRIPTION

Figure 2:
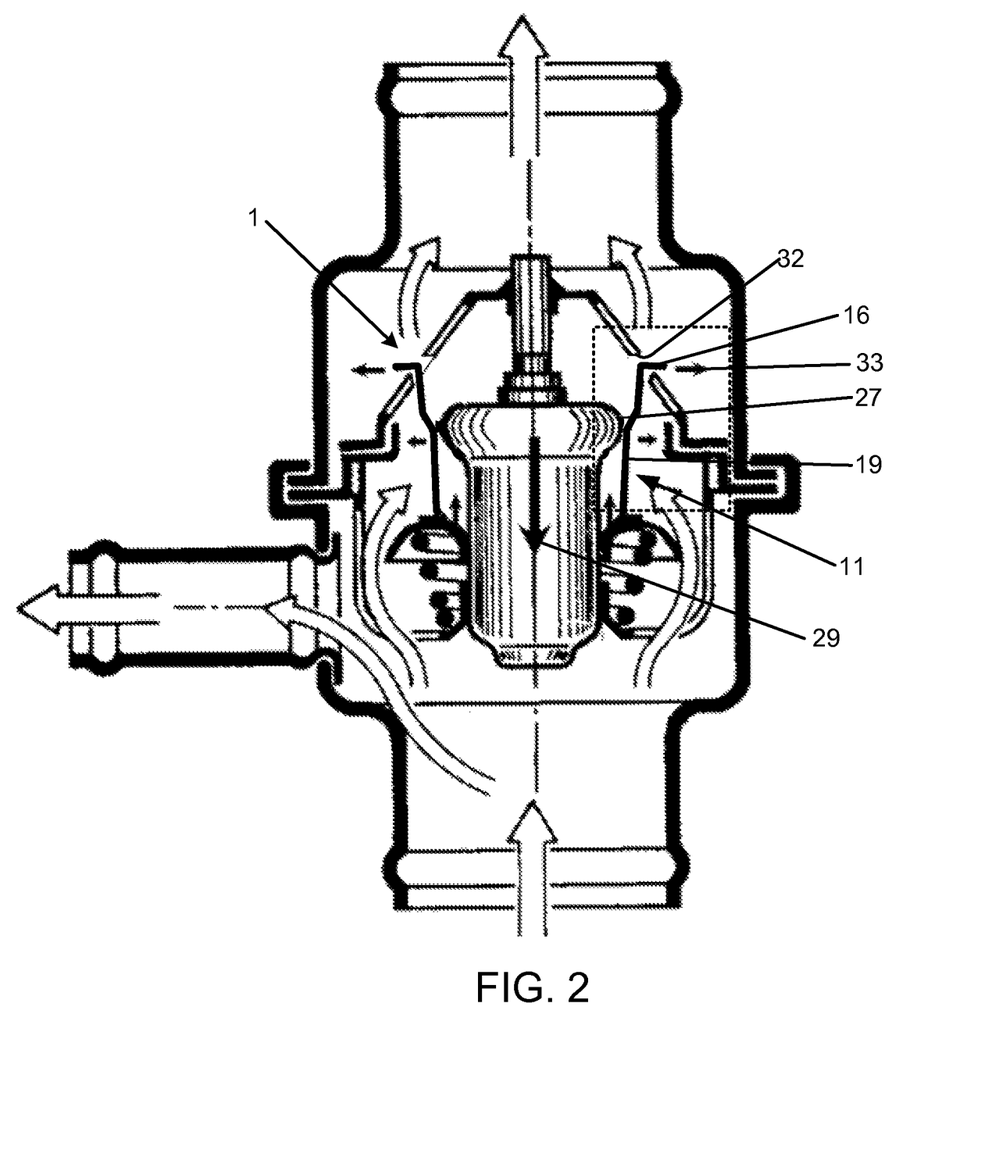
FIG. 2 shows the control valve from FIG. 1 in another position according to an embodiment of the present disclosure.
Figure 3:
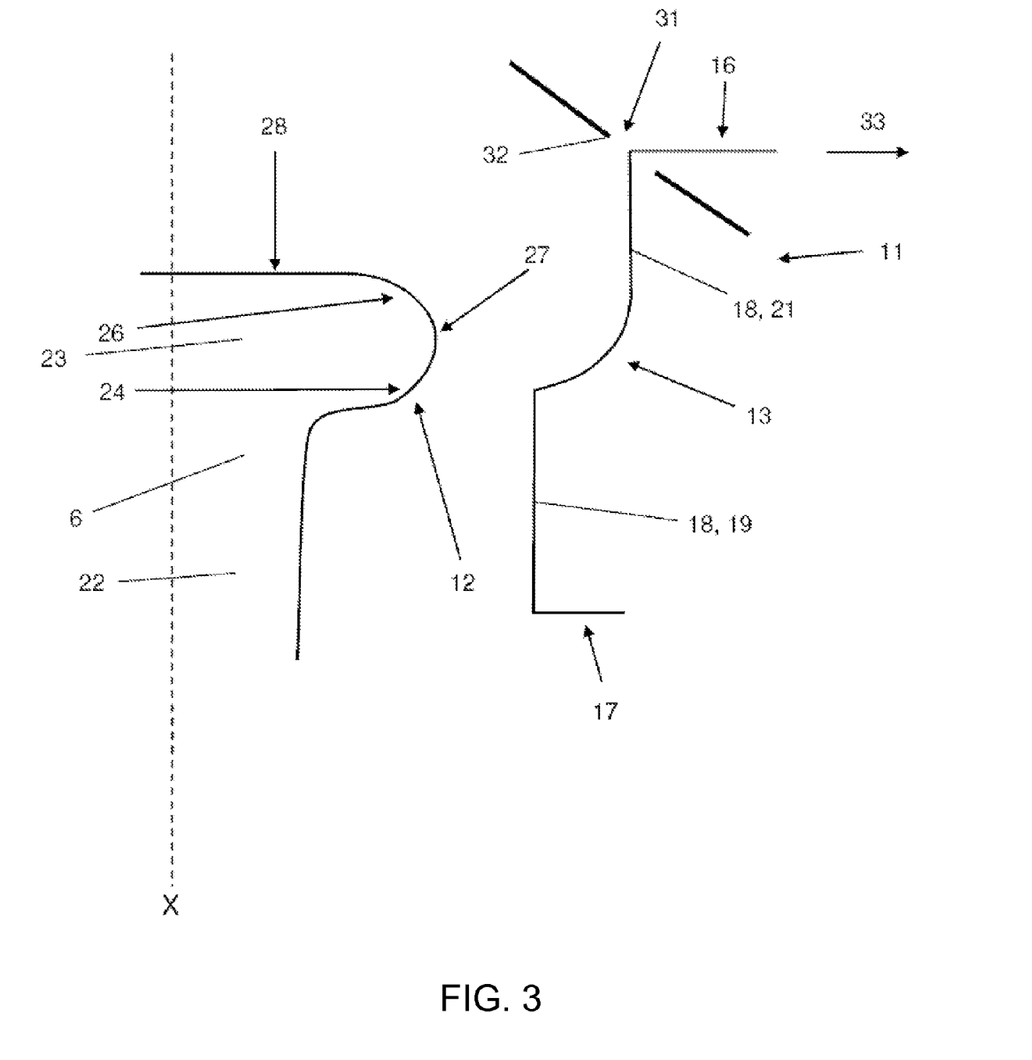
FIG. 3 shows an enlarged detail from FIG. 2 for schematic representation of the latching partners.
Figure 4:
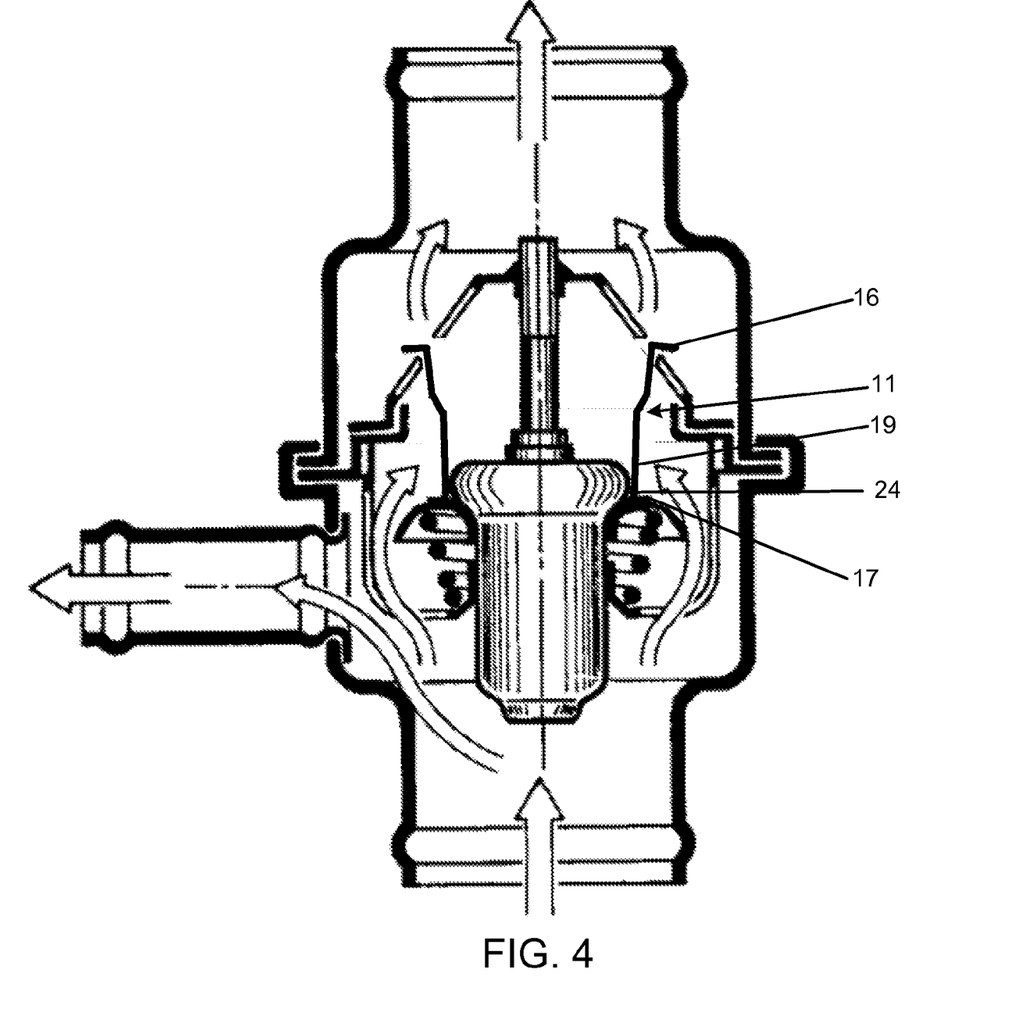
FIG. 4 shows the control valve from FIG. 1 with a coolant at operating temperature.
Figure 6:
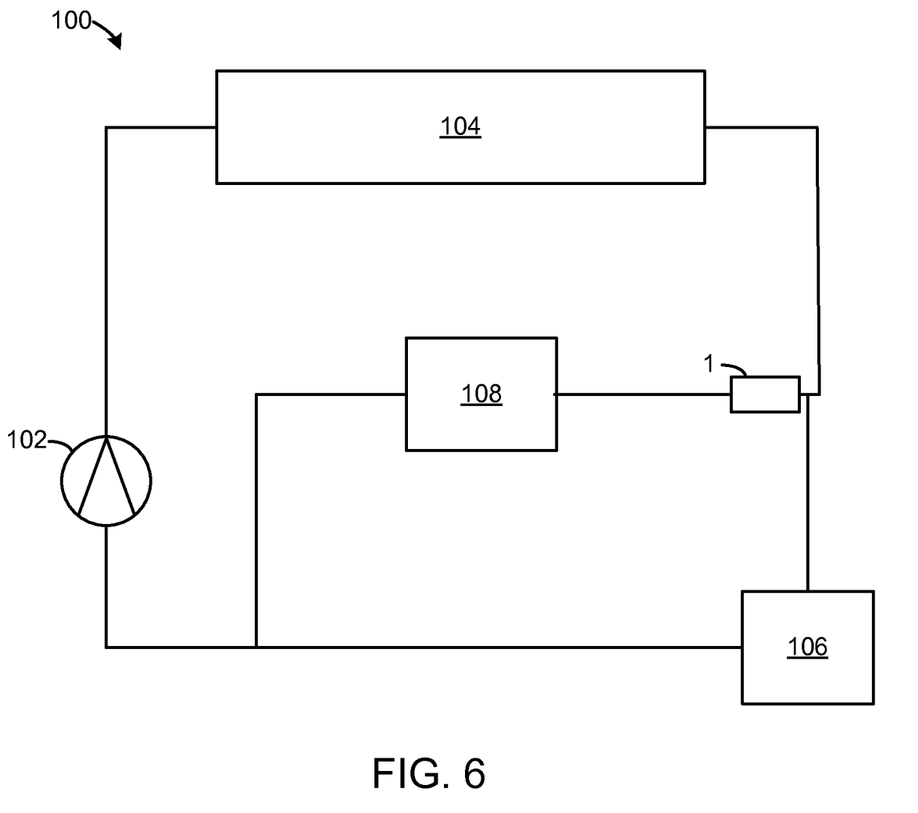
FIG. 6 shows a schematic representation of a coolant circuit according to an embodiment of the present disclosure.
Figure 7:
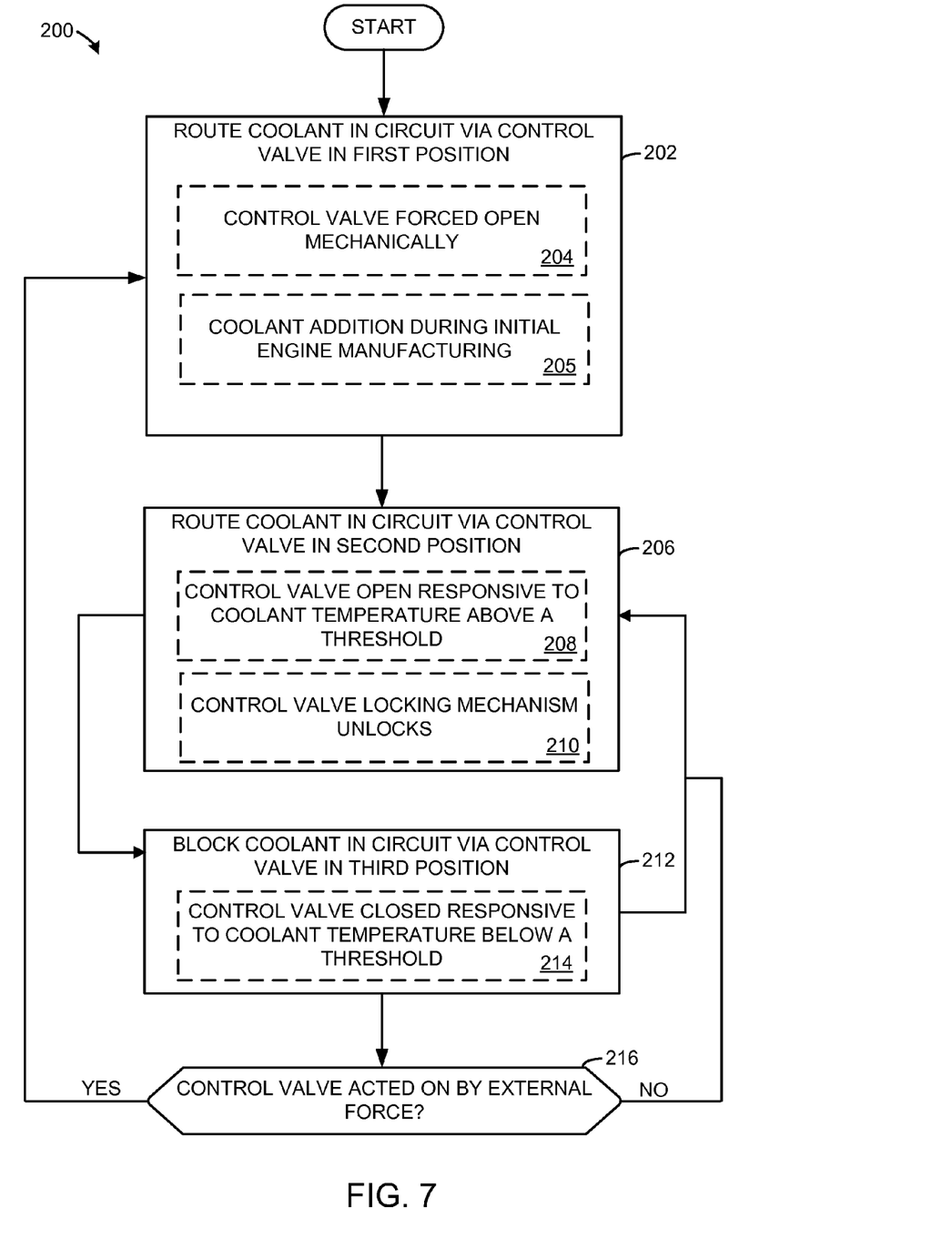
FIG. 7 shows a flow chart illustrating an example method of controlling coolant flow in a coolant circuit.

The present disclosure provides for a control valve in a medium circuit of an engine, such as a coolant circuit. The control valve has a plurality of positions in order to control the flow of medium through the circuit. In a first position, depicted in FIG. 1, the control valve is mechanically blocked open to facilitate an initial fill of the medium into the circuit. Once the circuit is filled with coolant and the engine is operated, the control valve begins to move into a second position, responsive to the temperature of the medium. That is, the control valve contains an expansible material element that expands as the temperature of the medium increases. The second position is shown in FIGS. 2 and 4. FIG. 3 depicts a more detailed representation of the elements of the locking mechanism of the control valve. Once the medium in the circuit has cooled, such as during a subsequent cold start of the engine, the expansible material element contracts and the control valve assumes the third position, shown in FIG. 5. FIG. 6 is a schematic representation of a coolant circuit including the control valve. FIG. 7 is a flow chart illustrating a method of controlling the flow of coolant in a coolant circuit via the control valve. In the different figures the same parts are always denoted by the same reference numerals, so that as a rule these parts are described only once.

Figure 1:
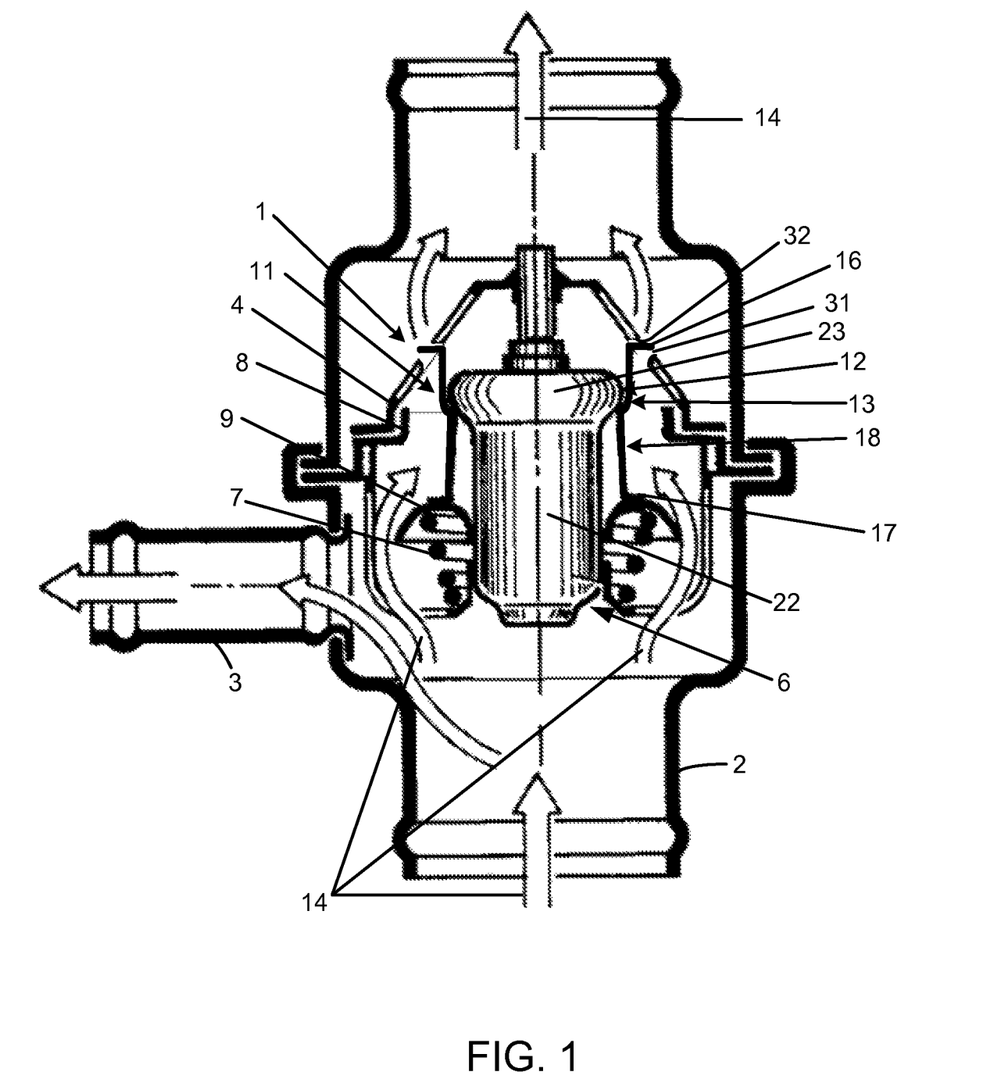
FIG. 1 shows an embodiment of a control valve in a mechanically fixed open position.

FIG. 1 shows a control valve 1 for a medium circuit of an internal combustion engine. The medium circuit may be substantially empty before the fluid or medium is added, for example after an initial build at an assembly plant. The control valve 1 as shown in FIG. 1 is in a first position, wherein it is forced open mechanically so that the fluid can be added to the medium circuit during manufacturing of the engine or vehicle assembly before final assembly is completed of the vehicle, and/or before end of the line engine testing. The control valve 1 is exemplified as a thermostat 1 for a coolant circuit. It is preferred if the control valve 1 is in the form of a thermostat with a temperature-sensitive positioning element, preferably an expansible material element, which is designed to control operationally-determined coolant flows in a coolant circuit of the internal combustion engine. The expansible material element may also be referred to as a wax element, which reacts to temperature changes of the coolant. In other words, in its normal function the control valve prevents coolant from flowing when the medium or the coolant is cold, and enables a steplessly adjustable flow of coolant in the coolant circuit as the coolant is increasingly heated during operation of the internal combustion engine, as will be described in more detail with respect to FIGS. 4 and 5. As exemplified, the control valve 1 is arranged in a conduit section 2 of a coolant circuit, which conduit section 2 has in the example a bypass 3 oriented to the left in the drawing plane and leading to a heater circuit, for example.

The control valve 1 has a valve housing 4 in which an expansible material element is arranged in a valve body 6. In normal operation of the control valve 1 or when ready for service, the valve body 6 is operatively connected to an energy accumulator 7, here depicted as a spring, the energy accumulator being tensioned in FIG. 1, so that the operative connection is initially canceled in the forced-open position represented in FIG. 1.

Figure 5:
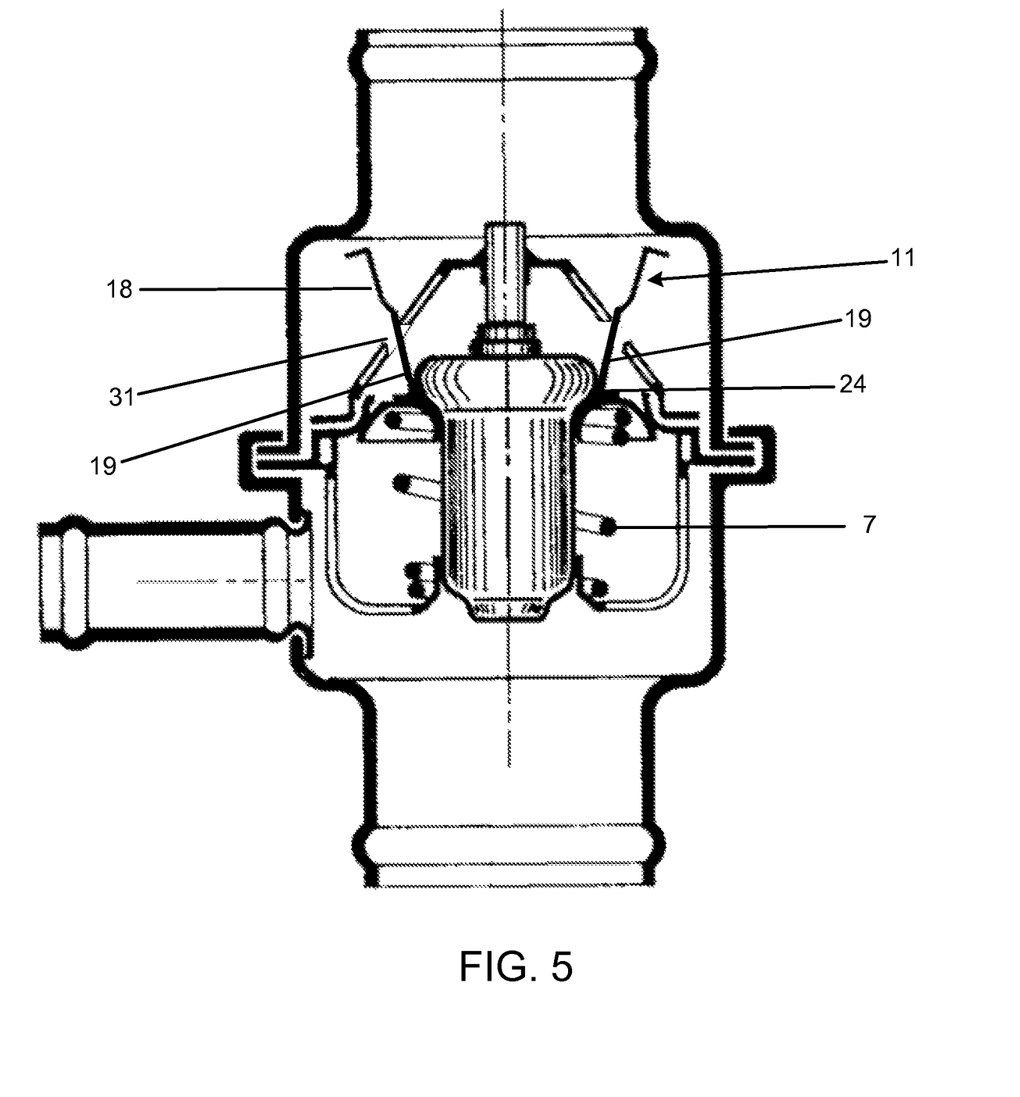
FIG. 5 shows the control valve from FIG. 1 in its closed position when the coolant has cooled down.

The energy accumulator 7 has an abutment element 9 which, when the control valve is in its closed position (as shown in FIG. 5) connects to a corresponding valve seat 8. Arranged on the abutment element 9 is at least one locking element 11 which has a counter-abutment face 13 adjacent to a corresponding abutment face 12 of the valve body 6, which abutment and counter-abutment faces 12, 13 can be more clearly seen in FIG. 3.

The abutment element 9 may also be referred to as a spring support plate which supports the head end of the energy accumulator 7, in the form of a helical spring in the preferred configuration, the sealing face which seals with the valve seat 8 while the valve in the closed position being arranged on the spring support plate.

In the forced-open position of the control valve 1 represented in FIG. 1, the abutment face 12 is in non-positive engagement with the counter-abutment face 13, a counter-latching face 16 of the locking element 11 being non-positively connected to a latching face 32 of the valve housing 4. That is to say that the counter-latching face 16, also referred to as the head member, of the locking element 11 bears against an opening edge 32 in the valve housing 4. Accordingly, the latching face 32 is advantageously formed by an opening 31, or by the opening edge thereof, formed in the cover of the valve housing 4. The control valve 1 can be delivered and installed in this forced position. Of course, the forced-open position may also be established directly prior to installation.

In this embodiment, a non-positive connection of the locking element 11 to the corresponding housing region is a type of connection which is maintained in the joining direction of the joint partners but can be canceled against the joining direction of the joint partners without the joint partners being destroyed, so that the open position of the control valve can be reset at any time by means of the locking element, for example for maintenance purposes, that is for refilling or topping-up after the initial filling.

Because the head member 16 of the locking element 11 is supported against the valve housing 4 and its foot member 17 against the abutment element 9, the energy accumulator 7 remains in its tensioned position, whereby the abutment element 9 is held in the open position, or is forcibly locked, with respect to the valve seat 8.

Thus, medium, for example coolant, can be introduced into the cooling system (initial filling) without the need for the cooling system to be evacuated. Of course, the medium to be introduced should be at a temperature below the expansion-effecting temperature of the expansible material element. A flow of medium during the initial filling, and also a flow of medium after filling when the control valve 1 is not forced open (FIGS. 2 and 4), is indicated by means of the arrows 14.

In some embodiments, it may be advantageous if a plurality of locking elements, such as four or six locking elements, are provided at an equal distance from one another, viewed in the circumferential direction. In the embodiment depicted in FIG. 1, two locking elements 11 are visible. All of the locking elements 11 are independent of one another but are configured identically, for which reason only one is described.

Turning to FIG. 3, details of the valve body 6, the locking element 11 and the valve housing 4, or its cover, are represented, other components being omitted. The locking element 11 comprises its head member 16 and its foot member 17 located opposite thereto. The head member forms the counter-latching face 16.

In relation to a central axis X of the control valve 1, the head and foot members 16, 17 are oriented away from the central axis X in the same direction. A working bridge 18 is arranged between the head member 16 and the foot member 17. The working bridge 18 has a bridge foot section 19 and a bridge head section 21. A transition section which forms the counter-abutment face 13 is arranged between the bridge foot and head sections 19, 21. The working bridge 18 may also be referred to as the spring bridge, which initially maintains the non-positive connection of the abutment and counter-abutment partners 12, 13, but also, in particular, the non-positive connection of the latching partners, the counter-latching face 16 and the latching face 32.

The working bridge 18 is configured in such a manner that, in relation to the central axis X, its bridge foot section 19 is arranged closer thereto than the bridge head section 21 when the abutment face 12 is in non-positive abutment with the counter-abutment face 13.

In the situation represented in FIG. 1, the locking element 11, which may also be referred to as the clamp 11, is not spread in an outward direction relative to the valve body. It can be seen in an exemplary manner that the foot member 17 is disposed substantially parallel to the head member 16, the energy accumulator 7 being tensioned by the non-positive connection of the two latching partners 16, 32.

The locking element 11 is connected by the foot member 17 to the abutment element 9, which can also be regarded as the spring support plate for the energy accumulator 7. Thus, although all the locking elements 11 are separated from one another, they are operatively connected to one another via the abutment element 9.

It can be seen that if at least one of the head members 16 is acted upon, the further locking elements 11 can necessarily be entrained therewith. Also possible is a configuration of a locking element which has a foot member disposed continuously in the circumferential direction and having projecting therefrom working bridges spaced in the circumferential direction, on which the head member would be arranged. It is also possible to provide only a single locking element.

Referring back to FIG. 3, the valve body 6 containing the expansible medium element has a substantially cylindrical main body 22 which merges into a head region 23. In relation to the central axis X, the head region 23 has two regions 24, 26 configured opposite one another, of which a first, lower region 24, viewed in longitudinal section, widens approximately in the manner of a spherical segment up to a zenith 27, while a second, upper region 26, viewed in longitudinal section, narrows approximately in the manner of a spherical segment in the direction towards the central axis X up to an end face 28. The first, lower region 24, viewed in longitudinal section, forms the abutment face 12. It is, of course, also possible if at least the first, lower region 24, viewed in longitudinal section, is configured conically as far as the zenith 27.

It can be seen in FIG. 3 that a transition from the main body 22 to the first, lower region 24, viewed in longitudinal section, has a configuration slightly opposed to the curvature of the lower region 24. It is advantageous if a transition of the bridge foot section 19 to the counter-abutment face 13 of the locking element 11 also has a "soft" configuration such that the "sharp" edge illustrated is also slightly rounded in adaptation to the curvature of the valve body 6. This facilitates inter alia a thermally-determined canceling of the preferred non-positive connection of the two abutment partners 12, 13. Of course, the two abutment partners may also rest against one another without a non-positive connection.

It is advantageous if the transition section of the locking element, that is, the counter-abutment face, is configured with a negative curvature or negative configuration which cooperates with the exemplified curvature or with the configuration of the latching face, so that the transition section or the counter-abutment face can be described approximately as a recessed receptacle in which the abutment face of the expansible material element housing can be received.

Once the cooling system has been initially filled with coolant, the internal combustion engine can be started, other operating media, etc., not being considered. As this happens the housing of the expansible material element initially remains in its position. As the duration of operation increases the coolant is heated, whereupon the expansible material element, or the wax element, expands, so that the valve body 6 is displaced (arrow 29) along the central axis X towards the lower edge in the drawing plane, as can be seen in FIG. 2.

In this way the non-positive connection of the two latching partners 16, 32, but also of the abutment partners 12, 13, is disabled, so to speak automatically, in a temperature-determined manner, so that the control valve 1 is no longer blocked, that is, is no longer forced open through mechanical causation, and thus can move into the second position.

As shown in FIGS. 2 and 4, with increasing temperature, the expansible material element, or the wax element, expands such that the zenith 27 of the valve body 6 comes into contact with the bridge foot section 19 of the working bridge 18. The expansible material element may expand so far that the head region 23, or its first, lower region 24, viewed in longitudinal section, rests against the abutment element 9. During the axially oriented displacement, the zenith 27 slides along the bridge foot section 19, whereby the locking element 11, or the clamp, is spread. With the spreading, the head member loses contact with the valve housing. Nevertheless, head member 16 and foot member 17 are disposed, as exemplified, parallel to one another (FIG. 4). The first, lower region 24, viewed in longitudinal section, of the head region 23, or its zenith 27, rests against the bridge foot section 19 in the region of the foot member 17. During the relative movement of the valve body 6 with respect to the locking element 11, the latter is spread further, as is represented by means of the arrows 33 in FIG. 2. During this spreading movement the head member or members 16 slide/s along the opening edge 32, with an orientation away from the central axis X, until the non-positive connection of the two latching partners 16, 32 is disabled. In this way the control valve 1 is opened in a temperature-determined manner and therefore is no longer forcibly blocked. The locking element 11 is now, so to speak, in a free position in which it, in particular the bridge head section 21 thereof, can move through the opening 31. Since the foot member of the locking element is connected to the abutment element, only the head member is displaced relative to the latching face.

In this way the non-positive connection of the two latching partners 16, 32, but also of the abutment partners 12, 13, is disabled, so to speak automatically, in a temperature-determined manner, so that the control valve 1 is no longer blocked, that is, is no longer forced open through mechanical causation.

Turning to FIG. 5, if the coolant cools down, the control valve moves into the third position due to the expansible material element contracting. This causes an axial return movement of the valve body 6 directed oppositely to the axial displacement described previously, that is, towards the upper edge in the drawing plane. During this movement the foot member 17 of the locking element 11 advantageously remains in contact with the head region 23, the energy accumulator 7 relaxing with the return movement of the valve body 6. The locking element 11 is thus entrained through spring force in the same direction as the return movement of the valve body 6, whereby the locking element 11, in particular its bridge head section 21, is moved through the opening 31 of the valve housing 4. With increasing cooling of the coolant the expansible material element contracts to such an extent that the abutment element 9 rests against the valve seat 8, the locking element 11 being in effect entrained correspondingly through spring force. The locking element 11 is spread, and the two working bridges 18 to be seen in FIG. 5 being disposed approximately in a V-shape with respect to one another, viewed in longitudinal section. The control valve now has its normal, known function, whereby, upon renewed temperature-induced opening or closing, the locking element, resting under spring loading against the head region, is moved in the same direction as the movement of the housing.

In the situation represented in FIG. 5 the control valve 1 is shown in its closed position after the initial filling and after the coolant has cooled down. The control valve 1 is no longer forcibly blocked mechanically and can perform its normal function. Even upon renewed heating of the coolant there is no danger that the non-positive connection of the two latching partners 16, 32, or the connection of the two abutment partners 12, 13, will be unintentionally established, since the energy accumulator 7 prevents such a large relative movement of the locking element 11 with respect to the valve body 6. Rather, the energy accumulator 7 brings about a constant abutment of the abutment element 9 against the head region 23 of the valve body 6, so that the lower region 24 remains always in contact, in the region of the foot member 17, with the bridge foot section 19 of the locking element 11, whereby the locking element 11 remains in its spread position. However, it is also advantageous that the locking element 11, in particular the bridge head section 21 thereof, has a length such that interlocking of the locking element 11 with the valve housing 4 is avoided with maximum temperature-induced expansion of the wax element. Additionally, the foot member 17 is fastened to the abutment element 9, so that the locking element 11 is movable together with the abutment element 9 when the non-positive connection is canceled through thermal causation.

It is, however advantageous, that the open position according to FIG. 1 can be re-adopted if an external force acts, for example manually, on at least one of the head members 16. The energy accumulator 7 is thereby tensioned until the counter-abutment face 13 comes perceptibly into non-positive abutment with the abutment face 12. In addition, the head member 16, or the counter-latching face 16, again comes into non-positive abutment with the latching face 32, so that the locking element 11 is supported against the opening edge 32 via the abutment with its head member 16 and holds the energy accumulator in the tensioned position. In this way the control valve 1 has again reached its intended mechanically blocked, forced-open position, which can again be disabled through thermal causation by expansion of the expansible medium element.

Through the mechanically blocked, forced opening of the control valve 1 the exemplary cooling circuit can be refilled or topped-up for maintenance purposes without the need for complicated evacuation of the cooling system.

The control valve 1 can be brought mechanically, by means of the at least one locking element 11, into a blocked, forced-open position, or is brought to that position during initial installation, which position is canceled automatically, that is, in a self-actuating manner, through thermal causation, unintended blocking being avoided in order to ensure secure normal operation, while the blocked, forced-open position can nevertheless be reestablished intentionally.

In some embodiments, the locking element may have a length such that an undesired non-positive connection of the joint partners (head member/opening edge) is avoided when the wax element expands to the maximum in a temperature-determined manner. In addition, a configuration with regard to the length and/or the material thickness and/or the material of the locking element may be selected such that deformation is ruled out.

Should it be necessary at any time to refill or top-up the coolant circuit for maintenance purposes, the locking element can be pushed back into the valve housing by the application of an external force, for example manually via the head member, so that the energy accumulator is tensioned, the joint partners again adopt a non-positive connection and the control valve is in its forced-open position.

The advantage of the disclosed configuration, therefore becomes apparent, namely that a rapid and reliable initial filling, but also refilling and topping-up for maintenance purposes, is possible by means of a mechanical locking element, without the need to evacuate the cooling system, for example. The non-positive connection is canceled practically automatically through thermal causation by means of the normal operation of the wax element, the control valve then performing its normal service function.

It is advantageous if the locking element is formed from a material which is elastic but at the same time is able to maintain the non-positive connection. Self-evidently, a suitable material should be selected while also having regard to a certain resistance to the surrounding medium (water, coolant, additive, temperature). For this reason it is suggested that the locking element is formed from a spring steel or from a suitable plastics material. The non-positive connection, or the abutment force of the latching face against the counter-latching face, or of the abutment face against the counter-abutment face, should usefully be adjustable, through suitable material selection with regard to its spring force, in such a manner that said non-positive connection can be canceled only in a temperature-determined manner, or through the spreading of the locking element by means of the expansible material element housing, that is, by a relative movement of the housing with respect to the locking element in the direction of the abutment element, when the cooling system is initially filled and/or is refilled or topped-up.

In an advantageous configuration, there are provided a plurality of locking elements, for example four or six locking elements, which might be spaced equally from one another in a circumferential direction around the central axis. In this case it is, of course, advantageous if a corresponding number of openings are also provided in the cover of the valve housing. The locking element or locking elements may also be referred to as clamps; if an individual head member is acted upon, each individual locking element is entrained practically by force through the respective connection of the foot member to the abutment element. As a result of the elastic configuration, the counter-abutment face snaps audibly into the abutment face, so that the operator can be made aware of correct latching, and of the desired positioning of the head member against the corresponding opening edge. However, it is also possible to configure a locking element in such a manner that it has working bridges, with head members and counter-latching faces arranged thereon, which project from a foot member disposed around the central axis in the circumferential direction.

Turning to FIG. 6, an example coolant circuit 100 according to one embodiment of the disclosure is depicted. Cooling circuit 100 includes a pump 102 for pumping coolant to an engine 104. After passing through the engine 104, the coolant is routed to the control valve 1. As described above with respect to FIG. 1, the coolant may bypass the control valve and enter into a heater circuit containing a heater 106 before returning to the pump 102. If the control valve 1 is in the open position (as shown in FIGS. 1, 2, and 4), coolant may flow through the control valve 1 and into a radiator 108 to cool the coolant before returning to the pump 102. If the control valve 1 is in the third, closed position (as shown in FIG. 5), coolant flow to the radiator 108 may be blocked to prevent cooling of the coolant.

FIG. 7 shows a flow chart illustrating an example method 200 for controlling coolant flow in a coolant circuit of an engine, such as circuit 100. Method 200 comprises, at 202, routing coolant through the coolant circuit via a control valve in a first position. The first position of the control valve comprises a mechanically forced open position at 204, in order to facilitate an initial coolant filling during initial engine manufacturing, at 205, without prior evacuation of the circuit. Upon completion of the filling, the engine may be operated, causing coolant to flow through the engine and increase in temperature. Responsive to this, at 206, the coolant may be routed through the coolant circuit via the control valve in a second position. The control valve is operable to move to the second position, at 208, responsive to the coolant temperature being above a threshold. As the control valve comprises an expansible material element that expands in response to an increase in the coolant temperature, once the coolant temperature reaches a threshold, the control valve locking mechanism unlocks at 210 to facilitate the move into the second position. The control valve will remain in the second position as long as the coolant temperature remains at or above the threshold. The coolant temperature threshold may be determined by the nature of the expansible material element, that is, by the composition, and thus the melting/solidifying point, of the expansible material element, and may be any suitable temperature.

At 212, the coolant is blocked from the coolant circuit with the control valve in the third position. The control valve is operable to move into the third position responsive to a temperature of the coolant falling below the threshold at 214. In the third position, the locking mechanism of the control valve remains unlocked. The control valve may move into the third position upon engine shut-off and/or a subsequent cold engine restart.

The control valve, once it has moved from the first position to the second position, remains in either the second or third position, responsive to the temperature of the coolant. However, at 216, if the control valve is acted on by an external force (such as during a coolant refill), the control valve is forced back in to the first mechanically blocked open position at 202 in order to facilitate refilling of the coolant circuit. If no external force is applied to the control valve, the control valve remains in either the second or third position, depending on the temperature of the coolant. In this manner, efficient coolant filling and refilling can be attained without the need to evacuate the coolant circuit.

It should be understood that in order to move into the third position, the control valve has to first move from the first position into the second position. That is, the control valve is not operable to close without first unlocking the mechanical locking mechanism. As explained above with respect to FIGS. 2 and 4, the mechanical locking mechanism, which comprises the counter-latching face of the locking element being in non-positive connection with the latching face of the valve housing, is unlocked responsive to expansion of the valve body, and thus the counter-latching face of the locking element becomes disconnected from the latching face of the valve housing. The expansion of the valve body occurs responsive to an increase in the temperature of the coolant. Once the locking mechanism has been unlocked, responsive to cooling of the coolant, the control valve may move into the third position. Additionally, once the locking mechanism has been unlocked, the control valve can freely move between the second and third positions unless acted upon by an external force.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling coolant flow, comprising:
   forcing an engine coolant control valve open in a first position by mechanically locking the control valve in an open position with a locking element non-positively connected to a valve housing, facilitating coolant addition to a coolant circuit, the locking element arranged circumferentially around a control valve central axis;
   routing coolant in the coolant circuit via the control valve in the first position;
   in response to coolant temperature above a threshold, disabling the non-positive connection of the locking element so that the control valve is in a second position, no longer forced open through mechanical causation;
   in response to coolant temperature below the threshold, blocking coolant flow in the coolant circuit via the control valve in a third position; and
   wherein the control valve further comprises an expansible material element arranged in a valve body, an energy accumulator having an abutment element and a valve seat, and wherein the locking element is fastened to the abutment element and movable together with the abutment element in the second position and the third position, the locking element having a counter-latching face and the valve housing having a corresponding latching face.

2. The method of claim 1, wherein the first position further comprises the counter-latching face of the locking element being in a non-positive connection with the corresponding latching face of the valve housing, the latching face being formed by an opening edge in the valve housing.

3. The method of claim 2, wherein the control valve is operable to move out of the first position and into the second position in response to an expansion of the expansible material element and wherein the control valve is operable to move into the third position responsive to contraction of the expansible material element, coupling the abutment element to the valve seat in order to close the control valve.

4. The method of claim 1, wherein the control valve is installed in the coolant circuit in the first position in order to allow the coolant circuit to be filled with coolant.

5. The method of claim 1, wherein after exiting the first position, the control valve moves freely between the second position and the third position and remains in either the second position or the third position unless acted upon by an external force.

6. The method of claim 1, wherein in the third and second positions, the locking element is spread and in the first position, the locking element is not spread.

* * * * *